US006390740B1

(12) United States Patent
Nesbitt et al.

(10) Patent No.: US 6,390,740 B1
(45) Date of Patent: May 21, 2002

(54) NON-CIRCULAR DIMPLES FORMED VIA AN ORBITAL PANTOGRAPH CUTTER

(75) Inventors: R. Dennis Nesbitt, Westfield; Mark L. Binette, Ludlow, both of MA (US)

(73) Assignee: Spalding Sports Worldwide, Inc., Chicopee, MA (US)

( * ) Notice: Subject to any disclaimer, the term of this patent is extended or adjusted under 35 U.S.C. 154(b) by 0 days.

(21) Appl. No.: 09/678,524

(22) Filed: Oct. 3, 2000

(51) Int. Cl.[7] .............................. B23C 3/02; B23P 17/02
(52) U.S. Cl. ............................ 409/132; 29/899; 409/86
(58) Field of Search ............................ 29/899; 409/131, 409/132, 86, 87–89, 93, 94; 473/378, 384; 408/1 R

(56) References Cited

U.S. PATENT DOCUMENTS

| | | | | |
|---|---|---|---|---|
| 922,773 A | | 5/1909 | Kempshall | |
| 1,666,699 A | | 4/1928 | Hagen | |
| 3,841,199 A | * | 10/1974 | Jepson et al. | 409/131 |
| 3,879,876 A | | 4/1975 | Morgan | |
| 4,681,323 A | | 7/1987 | Alaki et al. | |
| 4,787,638 A | | 11/1988 | Kobayashi | |
| 4,954,022 A | | 9/1990 | Underwood et al. | |
| 5,005,838 A | | 4/1991 | Oka | |
| 5,173,016 A | * | 12/1992 | Ellison et al. | 409/132 |
| 5,406,043 A | | 4/1995 | Banji | |
| 5,503,398 A | | 4/1996 | Lu | |
| 5,624,215 A | * | 4/1997 | Boucher et al. | 409/131 |
| 5,720,676 A | * | 2/1998 | Shimosaka et al. | 473/384 |
| 5,890,975 A | | 4/1999 | Stiefel | |
| 6,206,792 B1 | * | 3/2001 | Tavares et al. | 473/378 |

* cited by examiner

*Primary Examiner*—William Briggs

(57) ABSTRACT

A method for forming non-circular dimples in a spherical surface is characterized by the use of a pantograph to repeatedly translate a master dimple configuration into the spherical surface. A drill bit is drilled into a portion of the spherical surface to a first depth. The drill bit is displaced relative to the surface by the pantograph along a given path without altering the axial orientation of the bit in order to form a non-circular dimple in the surface. The bit is removed from the surface and the process is repeated across other portions of the surface to form identical dimples therein.

10 Claims, 1 Drawing Sheet

NON-CIRCULAR DIMPLES FORMED VIA AN ORBITAL PANTOGRAPH CUTTER

This invention relates generally to a method for manufacturing golf balls and specifically to a method for forming non-circular dimples in the surface of the ball.

BACKGROUND OF THE INVENTION

Golf balls are now being produced having various dimple patterns, dimple sizes, and geometric dimple patterns. Generally speaking, all of these dimples are configured so as to have a substantially constant geometric surface. Whether circular or multi-sided, the dimples are designed so that the geometrical configuration of each dimple is substantially the same regardless of its size. In this type of dimple arrangement, the dimples are normally configured in some pattern such as an octahedron, dodecahedron, or the like, or are configured so as to provide sections within each hemisphere in the ball surface, whether those sections number four, or six, or whatever desired configuration. Normally, the dimples are arranged in a desired pattern within each section and then this pattern is repeated for each section. The standard procedure is that each hemisphere has the same number of dimples and in substantially the same pattern and the hemispheres may be rotated with respect to each other depending upon the position of the mold halves.

The mold halves have dimple patterns formed therein so that when the cover layer is formed on the ball, the outer surface of the cover will be indented with the desired dimple pattern and configuration. The most common dimple configuration is a circular dimple.

BRIEF DESCRIPTION OF THE PRIOR ART

It is well-known in the patented prior art to form a hob having approximately the same dimensions as half of the finished golf ball and then forming a mold from the hob as disclosed in the Brown et al U.S. Pat. No. 3,831,423. The hob is drilled to a desired depth to define the circular dimples to be formed in the golf ball surface. Thus, the resulting mold has the desired dimple depth and configuration formed therein.

It is also known in the art to machine a mold for a golf ball using an electric discharge machine (EDM) electrode as disclosed in the U.S. patent to Underwood et al U.S. Pat. No. 4,954,022. A numerically controlled cutting tool is used to drill holes in the electrode to a uniform depth. During electrode discharge machining of the mold, bumps are formed in the mold surface by the holes in the electrode. The bumps define the dimples in the golf ball surface.

EDM technology has also been used to form a master die used to mold non-circular dimples in the surface of a golf ball as shown by the Banji U.S. Pat. No. 5,406,043.

While the prior methods and devices for machining molds for golf balls normally operate satisfactorily, they possess certain drawbacks. One such drawback is the expense required for EDM devices and numeric controls therefor. Another drawback is that the EDM technology is not as precise as prior drilling techniques. Thus, the molds formed thereby do not define clear accurate dimples, particularly where the dimples are non-circular.

The present invention was developed in order to overcome these and other drawbacks of the prior devices by providing an improved machining process for forming a hob used to create a mold for forming golf balls with non-circular dimples.

SUMMARY OF THE INVENTION

Accordingly, it is a primary object of the present invention to provide an improved method for forming non-circular dimples on a spherical surface using a pantograph for consistency in the configuration of all of the dimples. A first portion of the surface is drilled along a radius thereof to a first depth with a drill bit. Next, the drill bit is displaced relative to the surface along a given path defined by a pantograph without altering the axial orientation of the drill bit in order to form a non-circular dimple in the surface. The drill bit is then withdrawn from the surface and the surface is rotated to arrange a second portion of the surface beneath the drill bit. The drilling, displacing and withdrawing steps are repeated to form subsequent dimples in the surface, with all of the dimples having the identical non-circular configuration.

According to a further object of the invention, the drill bit is maintained at the first depth during the displacement steps so that an edge of each dimple is defined where the drill bit leaves the spherical surface.

Alternatively, the drill bit may be axially displaced relative to the first depth during the displacement steps so that the dimples have a variable depth.

BRIEF DESCRIPTION OF THE DRAWINGS

Other objects and advantages of the invention will become apparent from a study of the following specification when viewed in the light of the accompanying drawing, in which.

DETAILED DESCRIPTION

Figure 2:
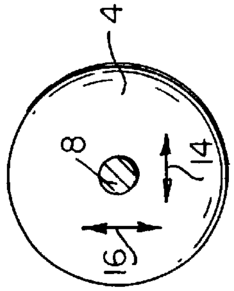
FIG. 2 is a top sectional view of the apparatus taken along line 2—2 of FIG. 1.
Figure 1:
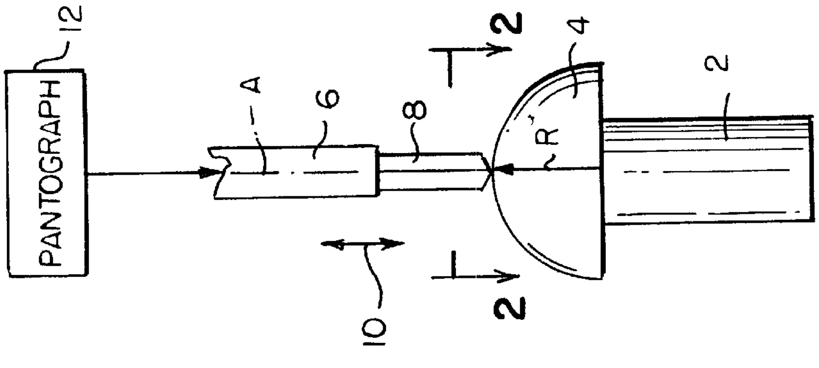
FIG. 1 is a plan view of the drilling apparatus used to form non-circular dimples according to the invention.

The present invention will be described in connection with forming dimples on a hob 2 having a hemispherical surface 4 as shown in FIGS. 1 and 2. As is known in the art, a hob is used to form the inner surface of a mold cavity provided in a mold plate used in the injection molding or compression molding of a cover layer on the core or center of a golf ball. A pair of mold plates each contain opposed hemispherical mold cavities which are embossed or otherwise formed with a patterned surface by a hob. The inner surface of each cavity has the same pattern formed therein. When a golf ball center is arranged in the spherical cavity defined when the plates are brought together, synthetic plastic material is injected into the cavity to form the cover layer of the golf ball. Alternately, two hemispherical half shells are compression molded around a golf ball center to form the dimples on the surface of the cover. The cover layer contains the same dimple pattern as is provided on the hob, with the lower hemisphere of the ball surface being identical to the upper hemisphere thereof.

Figure 4:
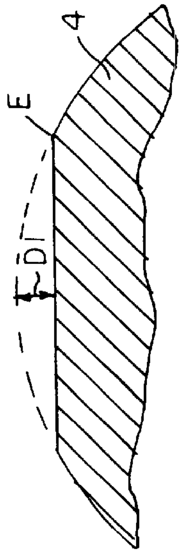
FIG. 4 is a sectional view of the dimple taken along line 4—4 of FIG. 3.

A drill 6 including a drill bit 8 having a fixed diameter is provided for cutting a plurality of non-circular dimples into the surface 4. The drill is initially arranged with its axis A extending along a radius R of the spherical surface. In a preferred embodiment, the drill is axially displaced so that the bit 8 cuts into the surface to a first depth D1. As shown in FIG. 4, which is a sectional view of a dimple formed by the drilling apparatus of FIGS. 1 and 2, the depth D1 is measured from the surface of the hob (which is shown in phantom in FIG. 4) to the bottom of the dimple along the radius of the hemispherical surface. The arrow 10 in FIG. 1 represents axial displacement of the drill 6.

After the drill bit has drilled to the depth D1, the drill and drill bit are laterally displaced relative to the surface along a given path defined by a pantograph 12 connected with the drill. During displacement, the axis of the drill remains constant. Thus, the drill axis is arranged at an angle to a radius of the spherical surface as the drill is displaced, the angle changing as the drill moves farther from the point at which it is first drilled into the surface. Drill displacement is in both X and Y directions as shown by the arrows 14 and 16, respectively in FIG. 2.

The pantograph 12 is a mechanical device comprising a framework of jointed rods in a generally parallelogram form which is used to reproduce a particular configuration. As applied to the drill in the present invention, a master dimple having a desired configuration is traced by the pantograph and movement of the drill is transposed into the spherical surface by the drill so that the dimple is reproduced in the surface. More particularly, as the pantograph traverses the master dimple, the drill bit simultaneously traverses the spherical surface to remove material therefrom to form the dimple. The master dimple preferably is 10–100 times greater in size than the dimple to be formed in the surface so that the surface dimple has a highly accurate configuration.

After a first dimple has been drilled into a first location on the spherical surface, the hob is rotated to arrange a second portion of the surface beneath the drill bit. The drilling process is repeated to form a second dimple in the spherical surface which is identical to the first dimple in size and configuration. Both dimples are identical in configuration to the master dimple but have a reduced size. The process is repeated until dimples are arranged across the entire hemispherical surface. The dimples may be arranged on the surface in a geometric pattern if desired. This is accomplished by controlling the rotation of the surface so that it is oriented during the drilling steps to define dimples in desired locations on the surface. Preferably, none of the dimples formed on the surface overlap.

Figure 3:
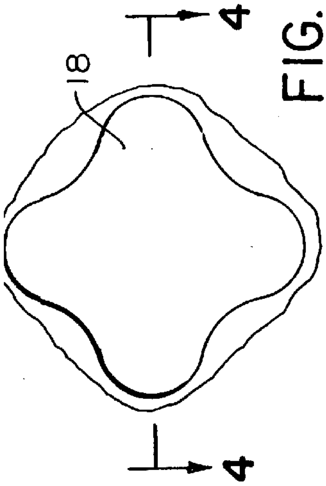
FIG. 3 is a top view of a non-circular dimple formed using the apparatus of FIG. 1.
Figure 5:
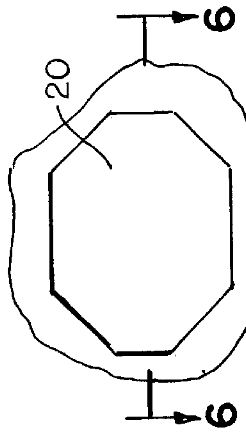
FIG. 5 is a top view of a second non-circular dimple formed using the apparatus of FIG. 1.

The dimples formed on the surface are non-circular. They may have any conceivable configuration. In the example shown in FIGS. 3 and 4, the dimple 18 has a cross shape, whereas in the example shown in FIGS. 5 and 6, an octagonal dimple 20 is shown. If displacement of the drill bit is limited to one direction, an elongated dimple will be defined. It is not necessary that the dimples be symmetric or geometric in shape, nor is it required that the dimples on the surface all have the same configuration. For example, a surface may include both cross and octagonal dimples, either all of the same size and shape or of different sizes and shapes. The invention may also be used to drill a surface having non-circular dimples, each having a different configuration.

Figure 6:
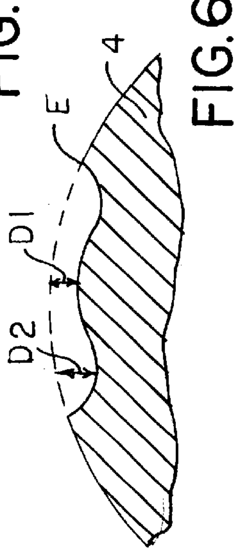
FIG. 6 is a sectional view of the dimple taken along line 6—6 of FIG. 5.

The drill bit may be displaced axially during displacement to define a dimple having a contoured bottom as shown in FIG. 6. The contour is defined by a dimple bottom surface which varies in depth owing to displacement of the drill bit between minimum and maximum depths D1 and D2.

Accordingly, variable depth dimples can be defined with an infinite number of depths measured at points along a radius of the dimple. The edge E of a dimple is defined where the drill bit leaves the surface. In a dimple formed where the drill bit is axially displaced during displacement, the edge will be more positively defined as shown in FIG. 6 as compared to the dimple edge E shown in FIG. 4 where the depth of the drill bit is constant.

Once the spherical surface is completely drilled, the hob is used to form the mold cavities for molding a cover layer on a golf ball. It will be appreciated that golf balls with various dimple configurations may be formed in accordance with the invention. The golf balls will have different flight characteristics in accordance with the dimple configurations formed therein.

What is claimed is:

1. A method of forming non-circular dimples in a spherical surface, comprising the steps of (a) drilling into a portion of the surface along a radius thereof to a first depth with a drill bit;

(b) laterally displacing the drill bit relative to the surface along a given path defined by a pantograph without altering the axial orientation of the drill bit, thereby forming a non-circular dimple in the surface;

(c) removing the drill bit from the surface;

(d) rotating the surface to arrange a different portion of the surface beneath the drill bit; and (e) repeating steps (a), (b), (c), and (d) to form a plurality of non-circular dimples in the surface, each of said dimples having the identical configuration.

2. A method as defined in claim 1, wherein said pantograph defines said given path based on a master dimple configuration which is traced by the pantograph and transposed in the spherical surface.

3. A method as defined in claim 2, wherein the drill bit is maintained at the first depth during said displacement steps, whereby an edge of each dimple is defined where the drill bit leaves the spherical surface.

4. A method as defined in claim 2, wherein the drill bit is axially displaced from said first depth during said displacement steps, whereby said dimples have a variable depth.

5. A method as defined in claim 2, wherein said path comprises a geometric shape.

6. A method as defined in claim 2, wherein the pantograph traces a path on the master dimple which is 10–100 times greater than the path of the drill bit, thereby increasing the accuracy of the dimples formed in the spherical surface.

7. A method of forming non-circular dimples in a spherical surface, comprising the steps of (a) drilling into a first portion of the surface along a radius thereof to a first depth with a drill bit;

(b) laterally displacing the drill bit relative to the surface along a first given path defined by a pantograph without altering the axial orientation of the drill bit, thereby forming a first non-circular dimple in the surface;

(c) removing the drill bit from the surface;

(d) rotating the surface to arrange a second portion of the surface beneath the drill bit;

(e) drilling into a second portion of the surface along a radius thereof to a second depth with a drill bit;

(f) laterally displacing the drill bit relative to the surface along at least a second given path defined by a pantograph without altering the axial orientation of the drill bit, thereby forming at least a second non-circular dimple in the surface; and (g) repeating steps (a)–(f) to form at least a plurality of first and second non-circular dimples in the surface, said first dimples having a first identical configuration, respectively, and said second dimples having a second identical configuration different from said first identical configuration.

8. A method as defined in claim 7, wherein the drill bit is axially displaced from said first depth during said displacement steps, whereby said dimples have a variable depth.

9. A method of forming non-circular dimples in a spherical surface, comprising the steps of (a) drilling into a portion of the surface along a radius thereof to a first depth with a drill bit;

(b) laterally displacing the drill bit relative to the surface along a first path defined by a pantograph without altering the axial orientation of the drill bit, thereby forming a non-circular dimple in the surface;

(c) removing the drill bit from the surface;

(d) rotating the surface to arrange a second portion of the surface beneath the drill bit; and (e) repeating steps (a), (b), (c), and (d) to form additional non-circular dimples, said laterally displacing step for each additional dimple being along a path different from said first path, whereby each additional dimple has a different configuration.

10. A method as defined in claim 9, wherein the drill bit is axially displaced from said first depth during said displacement steps, whereby said dimples have a variable depth.

* * * * *